United States Patent
Makita et al.

(10) Patent No.: US 10,000,111 B2
(45) Date of Patent: Jun. 19, 2018

(54) GARNISH AND FRAME MOLDING APPARATUS AND METHOD OF PRODUCING A VEHICLE DOOR

(71) Applicant: SHIROKI CORPORATION, Kanagawa (JP)

(72) Inventors: Jun Makita, Kanagawa (JP); Takashi Kameyama, Kanagawa (JP)

(73) Assignee: SHIROKI CORPORATION, Kanagawa (JP)

( * ) Notice: Subject to any disclaimer, the term of this patent is extended or adjusted under 35 U.S.C. 154(b) by 0 days. days.

(21) Appl. No.: 15/023,160

(22) PCT Filed: Sep. 8, 2014

(86) PCT No.: PCT/JP2014/073659
§ 371 (c)(1),
(2) Date: Mar. 18, 2016

(87) PCT Pub. No.: WO2015/041086
PCT Pub. Date: Mar. 26, 2015

(65) Prior Publication Data
US 2016/0221421 A1   Aug. 4, 2016

(30) Foreign Application Priority Data

Sep. 18, 2013   (JP) .................................. 2013-192539

(51) Int. Cl.
*B60J 5/04*   (2006.01)
*B60R 13/04*  (2006.01)

(52) U.S. Cl.
CPC .......... *B60J 5/0402* (2013.01); *B60J 5/0404* (2013.01); *B60R 13/04* (2013.01)

(58) Field of Classification Search
CPC .......... B60R 1/06; B60J 5/0402; B60J 5/0404
See application file for complete search history.

(56) References Cited

U.S. PATENT DOCUMENTS 4,432,167 A * 2/1984 Watanuki ............... B60J 5/0404
49/502
4,969,295 A * 11/1990 Nishikawa ............. B60J 5/0402
296/146.2

(Continued)

FOREIGN PATENT DOCUMENTS

JP   H0463227    5/1992
JP   05-178097   7/1993

(Continued)

OTHER PUBLICATIONS

English Abstract for JP2012-254769, Publication Date: Dec. 27, 2012.

(Continued)

*Primary Examiner* — Gregory J Strimbu
(74) *Attorney, Agent, or Firm* — Millen, White, Zelano & Branigan, P.C.; William Nixon

(57) ABSTRACT

A frame molding includes a horizontal portion extending along an upper edge of a door panel and an inclined portion extending obliquely upwards from the horizontal portion to be connected to an upper sash. A decorative garnish is formed from synthetic resin and has an external shape that corresponds to external shapes of the horizontal portion and the inclined portion of the frame molding. The dimensions of the frame molding in the vehicle widthwise direction are reduced. The positioned accuracy between the frame molding and the garnish is enhanced by fixing the garnish to the frame molding that is fixed to the door panel.

10 Claims, 7 Drawing Sheets

(56) References Cited

U.S. PATENT DOCUMENTS

| | | | | |
|---|---|---|---|---|
| 9,242,537 B2* | 1/2016 | Yoshida | ................ | B60J 10/085 |
| 2005/0223648 A1* | 10/2005 | Takeuchi | ............... | B60J 5/0404 |
| | | | | 49/502 |
| 2010/0115851 A1* | 5/2010 | Nakao | .................... | B60R 13/04 |
| | | | | 49/502 |
| 2011/0051272 A1* | 3/2011 | Murata | ................. | B60J 5/0404 |
| | | | | 359/872 |
| 2015/0203055 A1 | 7/2015 | Goto et al. | | |
| 2015/0321608 A1* | 11/2015 | Nishimura | ................ | B60R 1/06 |
| | | | | 359/871 |

FOREIGN PATENT DOCUMENTS

| | | | |
|---|---|---|---|
| JP | 2002286004 A | 10/2002 | |
| JP | 2003305774 A | 10/2003 | |
| JP | 2007062399 A | 3/2007 | |
| JP | 2008195198 A | 10/2008 | |
| JP | 2009298351 A | 12/2009 | |
| JP | 201036688 A | 2/2010 | |
| JP | 2012254769 A | 12/2012 | |
| JP | 2014-189235 A | 10/2014 | |
| WO | WO 2013/125015 | * | 8/2013 |
| WO | 2014034232 A1 | 3/2014 | |

OTHER PUBLICATIONS

English Abstract for JP-2010-036688, Publication Date: Feb. 18, 2010.
English Abstract of JP2009-298351, Publication Date: Dec. 24, 2009.
English Abstract of JP-2008-195198, Publication Date: Aug. 28, 2008.
English Abstract of JP-2007-062399, Publication Date: Mar. 15, 2007.
English Abstract of JP-2003-305774, Publication Date: Oct. 28, 2003.
English Abstract of JP-2002-286004, Publication Date: Oct. 3, 2002.
English Abstract of JP-05-178097, Publication Date: Jul. 20, 1993.
English Translation of Office Action for related Japanese Patent Application No. 2013-192539 dated Jul. 11, 2017.
English Abstract for JP2014-189235, Publication Date: Oct. 6, 2014.

* cited by examiner

GARNISH AND FRAME MOLDING APPARATUS AND METHOD OF PRODUCING A VEHICLE DOOR

TECHNICAL FIELD

The present invention relates to a frame molding, provided with a decorative garnish, which is provided at a triangular corner portion of a door sash on top of a door panel, and a method of producing a vehicle door.

BACKGROUND ART

Vehicle doors are provided with a sash, which forms a window opening, integrally formed on top of a door panel. The sash is generally provided with an upper sash which extends obliquely upwards from one of the front and rear ends of the door panel, and an upright pillar sash which extends upward from the other end; a triangular corner portion is formed between the upper sash and the upper edge of the door panel. Sometimes such a triangular corner portion is formed not only on a vehicle front side door, but also on a vehicle rear side door.

A frame molding made of metal, having V-shape in a side view and including a horizontal portion that extends along one of the front and rear ends of the door panel and an inclined portion that extends obliquely upwards from the horizontal portion and is connected to the upper sash, has been conventionally attached to such a triangular corner portion, which is formed by the upper sash and the upper edge of the door panel. In the triangular space of this frame molding, a garnish for decoration purposes which is made of synthetic resin is positioned to improve the outward appearance (Patent Literature 1).

In Patent Literature 1, the frame molding is fixed to the door panel (doorframe) via a special bracket, and the garnish is fixed to this bracket. Since the bracket is one of the door panel-side members, both the frame molding and the garnish are fixed to the door panel.

CITATION LIST

Patent Literature

Patent Literature 1: Japanese Unexamined Patent Publication H05-178097

SUMMARY OF THE INVENTION

Technical Problem

However, in this conventional fixing (supporting) structure for the frame molding and the garnish, since a bracket exists between the frame molding and the garnish, a space therefor which is large in the vehicle widthwise direction is required; additionally, it is difficult to define the positions of the frame molding and the garnish with precision. Specifically, if the operation to fix the frame molding to the door panel and the operation to fix the garnish to the door panel are independently performed, the dimensional control between the frame molding and the garnish becomes difficult, which makes it difficult to obtain an excellent appearance.

Based on the above described problems of the conventional art, an object of the present invention is to obtain a garnish-attached frame molding and a method of producing a vehicle door, by reducing the dimensions in the vehicle widthwise direction and enhancing the positional accuracy between the frame molding and the garnish.

Solution to Problem

The inventors of the present invention have accomplished the present invention from the viewpoint that the problems of the conventional art can be solved by fixing the garnish to the frame molding and fixing this frame molding to the door panel without fixing the garnish to the door panel.

The present invention is characterized by a garnish-attached frame molding including a frame molding which is configured to be fixed to a door panel and includes a horizontal portion, which extends along an upper edge of the door panel, and an inclined portion which extends obliquely upwards from the horizontal portion to be connected to an upper sash; and a decorative garnish which is made of synthetic resin, is fixed to the frame molding, and has an external shape that corresponds to external shapes of the horizontal portion and the inclined portion of the frame molding.

In a desirable embodiment, the frame molding includes a plurality of support plates which project inwardly from the horizontal portion and the inclined portion, a support hole being formed in each of the support plates, and wherein bosses which are thermally welded to the support holes while being inserted into the support holes, respectively, are formed on the garnish to project therefrom.

It is desirable for at least two of the support plates to be provided on the inclined portion, wherein at least one of the support plates is provided on the horizontal portion; one of the support holes that are formed in the two support plates on the inclined portion includes a reference circular hole which is engaged with an associated one of the bosses, which are formed as a cylindrical column, of the garnish with a small clearance; the other support hole that are formed in the two support plates includes a rotation prevention hole shaped into an elongated hole, a large clearance formed in a direction of extension of the inclined portion between the rotation prevention hole and an associated another of the bosses of the garnish; and the support hole that is formed in the horizontal portion includes a relief hole which is engaged with an associated the boss of the garnish with a large clearance.

It is desirable for the garnish to include an external surface portion which is positioned on an outer side, with respect to a vehicle widthwise direction; and a plurality of seat portions which are positioned closer to an inner side, with respect to the vehicle widthwise direction, than the external surface portion and are spaced from the external surface portion. The bosses are formed on the seat portions to project therefrom.

Contact projections which come in contact with portions of the support plates are formed on the seat portions.

The present invention is also characterized by a method of producing a vehicle door provided with a frame molding, which includes a horizontal portion extending along an upper edge of a door panel and an inclined portion extending obliquely upwards from the horizontal portion to be connected to an upper sash; and a decorative garnish formed from synthetic resin and has an external shape that corresponds to external shapes of the horizontal portion and the inclined portion of the frame molding, the method including a step of fixing the garnish to the frame molding, and a step of fixing the frame molding to the door panel.

Advantageous Effects of the Invention

An illustrated embodiment of the garnish-attached frame molding includes a garnish-attached frame molding including a frame molding which is configured to be fixed to a door panel and includes a horizontal portion, which extends along an upper edge of the door panel, and an inclined portion which extends obliquely upwards from the horizontal portion to be connected to an upper sash; and a decorative garnish which is made of synthetic resin, is fixed to the frame molding, and has an external shape that corresponds to external shapes of the horizontal port ion and the inclined port ion of the frame molding. Such a configuration facilitates the connecting operation to connect the garnish-attached frame molding and the vehicle door and makes it possible to reduce the total thickness of the garnish-attached frame molding in the vehicle widthwise direction.

Additionally, the present invention a vehicle door provided with a frame molding, which includes a horizontal portion extending along an upper edge of a door panel and an inclined portion extending obliquely upwards from the horizontal portion to be connected to an upper sash, a decorative garnish formed from synthetic resin and has an external shape that corresponds to external shapes of the horizontal portion and the inclined portion of the frame molding, and includes a step of fixing the garnish to the frame molding, and a step of fixing the frame molding to the door panel. Hence, since the garnish is fixed to the frame molding and the frame molding is directly fixed to the door panel without any intermediate member provided therebetween, the positional accuracy between the frame molding and the garnish can be enhanced, and the outward appearance can be improved.

DESCRIPTION OF EMBODIMENTS

Figure 1:
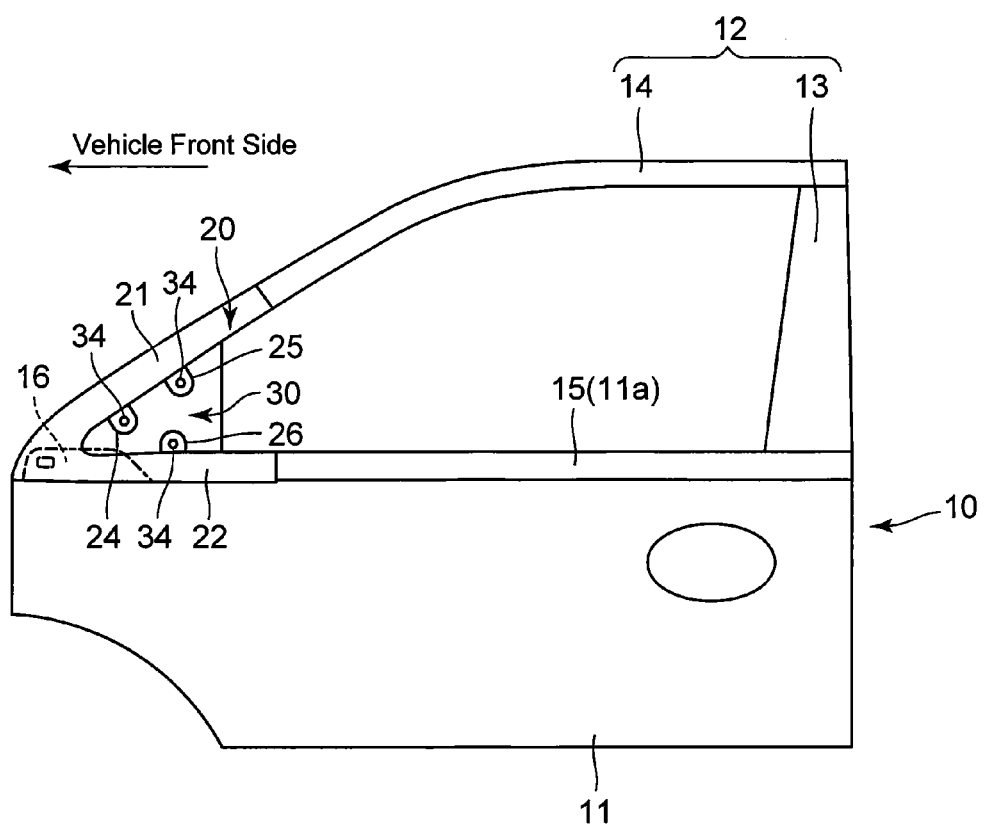
FIG. 1 is a side elevational view of an embodiment of a vehicle door in which a garnish-attached frame molding according to the present invention is connected to a door panel, viewed from the vehicle interior side.
Figure 2:
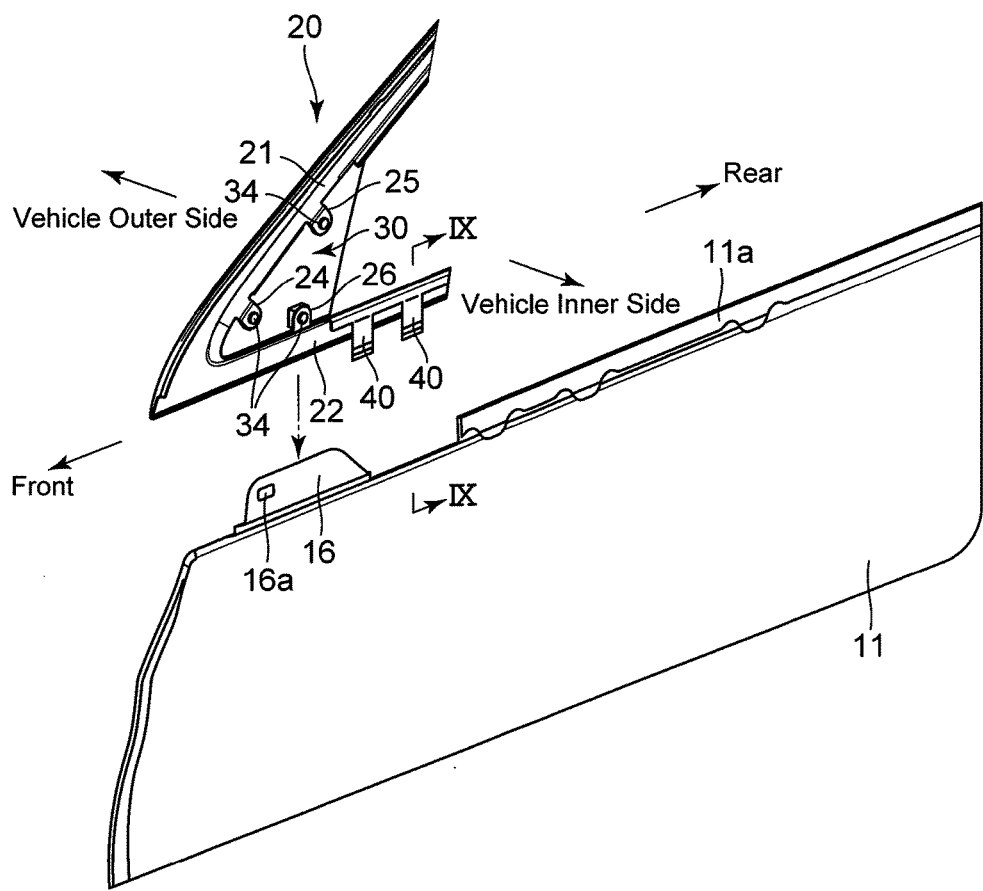
FIG. 2 is a perspective view of the garnish-attached frame molding and the door panel in a mutually separated state.

FIG. 1 shows a vehicle door 10, to which the present invention has been applied, for opening and closing a side opening of a vehicle body. The vehicle door 10 is a front door, and the outer surface of a lower half of the vehicle door 10 is formed of a metal outer panel (door panel) 11. A door sash 12 that constitutes an upper half of the vehicle door 10 is fixed to the top of the outer panel 11. The door sash 12 is provided with a rear sash (upright pillar sash) 13 which extends upward from the rear end of the outer panel 11, an upper sash 14 which extends obliquely downwards from the upper end of the rear sash 13, and a frame molding 20 which is positioned on top of the front end of the outer panel 11. The frame molding 20 is made of metal (e.g., SUS) and is provided with an inclined portion 21, which is connected to the front end of the upper sash 14, and a horizontal portion 22 which extends along an upper edge of the outer panel 11, thereby having the shape of a letter V in a side view. The horizontal portion 22 is connected to a molding mounting portion 11a (FIG. 2) which is formed on the upper edge of the outer panel 11, and is further connected to the front end of a belt molding 15 which is mounted to the molding mounting portion 11a. A sliding glass window (not shown) is installed in the window opening, formed by the door sash 12, to be upwardly and downwardly movable.

A garnish 30 made of synthetic resin is fixed to the frame molding 20. FIGS. 2 through 6 show an embodiment of the fixing structure to fix the frame molding 20 and the garnish 30 to each other. The frame molding 20 is provided on the inclined portion 21 with two support plates 24 and 25, and is provided on the horizontal portion 22 with one support plate 26. Each of the support plates 24, 25 and 26 is formed to project both inward (toward the inside of the V-shaped part that can be seen as the shape of a letter V in a side view) and toward the vehicle interior. Specifically, as clearly seen in FIG. 4, the inclined portion 21 and the horizontal portion 22 are provided with an outward appearance surface 21a and an outward appearance surface 22a, respectively, and the support plates 24, 25 and 26 are provided with inclined walls 24a, 25a and 26a which extend inwardly from the outward appearance surface 21a or 22a and front-back directional vertical walls 24b, 25b and 26b, which are continuous with the inner ends of the inclined walls 24a, 25a and 26a, respectively. Additionally, as viewed in the vehicle widthwise direction, the front-back directional vertical wall 24b is provided with a small-diameter reference circular hole (support hole) 24c, the front-back directional vertical wall 25b is provided with a rotation prevention hole (support hole) 25c which is formed as a hole elongated in the extension direction of the inclined portion 21, and the front-back directional vertical wall 26b is provided with a large-diameter relief hole (support hole) 26c.

Figure 4:
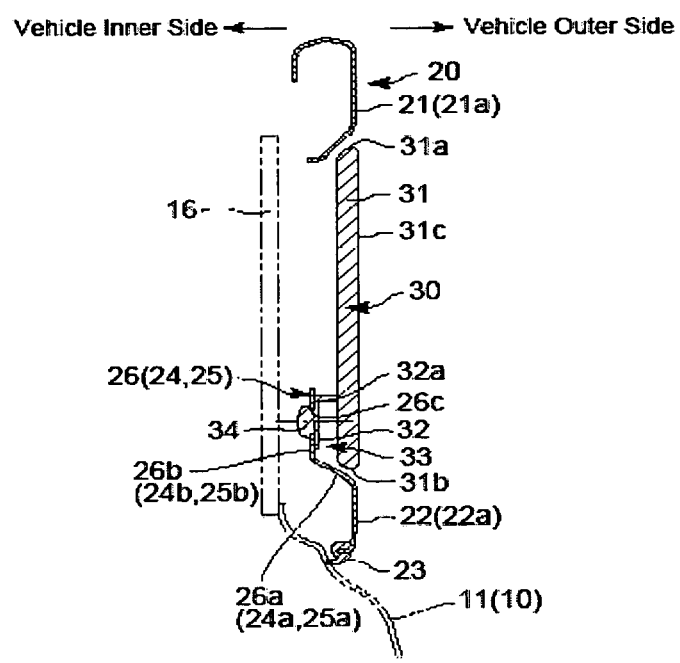
FIG. 4 is a cross sectional view taken along the line IV-IV shown in FIG. 3.

The garnish 30 that is made of synthetic resin is provided with an external surface portion 31 having an outward appearance surface 31x which is substantially flush with the outward appearance surface 21a of the inclined portion 21 and the outward appearance surface 22a of the horizontal portion 22. The external surface portion 31 has a triangular shape in a side view, being provided, in a side view, with a beveled edge 31a which is slightly greater in external shape than the inner periphery of the inclined portion 21, a horizontal edge 31b which is slightly greater in external shape than the inner periphery of the horizontal portion 22, and a vertical edge 31c which extends in the vertical direction. The beveled edge 31a and the horizontal edge 31b are inclined inwardly, toward the vehicle interior side from the vehicle exterior side (FIG. 4).

The garnish 30 is provided with three seat portions 32 which are positioned closer to the vehicle interior side than the external surface portion 31 and are formed to correspond to the support plates 24, 25 and 26, respectively. The three seat portions 32 have mutually substantially the same structure and are each connected to the external surface portion 31 via a connecting rib 32a which forms a clearance 33 (clearly shown only in FIG. 4) between the external surface portion 31 and the associated seat portion 32. A cylindrical columnar boss 34 is formed on each seat portion 32 to project toward the vehicle interior. The positions of each boss 34 and the associated connecting rib 32a are mutually different in the vehicle widthwise direction.

In this embodiment, the three bosses 34 are cylindrical columnar projections of the same size, and the bosses 34 are fitted in the reference circular hole 24c of the support plate 24 with minimum clearance, engaged with the rotation prevention hole 25c of the support plate portion 25 with a large clearance in the lengthwise direction thereof (fitted in the rotation prevention hole 25c of the support plate portion 25 with minimum clearance in a direction orthogonal to the lengthwise direction thereof), and fitted in the relief hole 26c of the support plate 26 with a large clearance.

Figure 5:
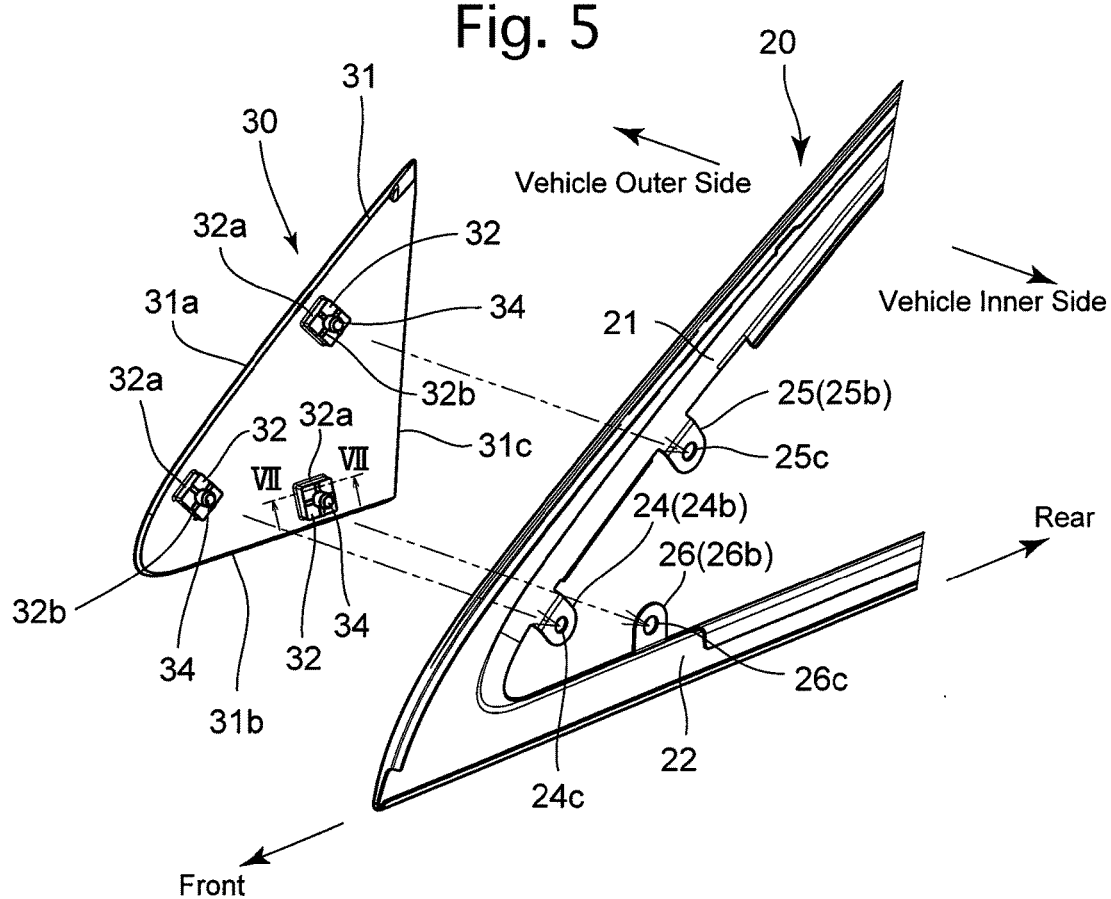
FIG. 5 is a perspective view of the garnish and the frame molding in a mutually separated state, viewed from the vehicle interior side.
Figure 6:
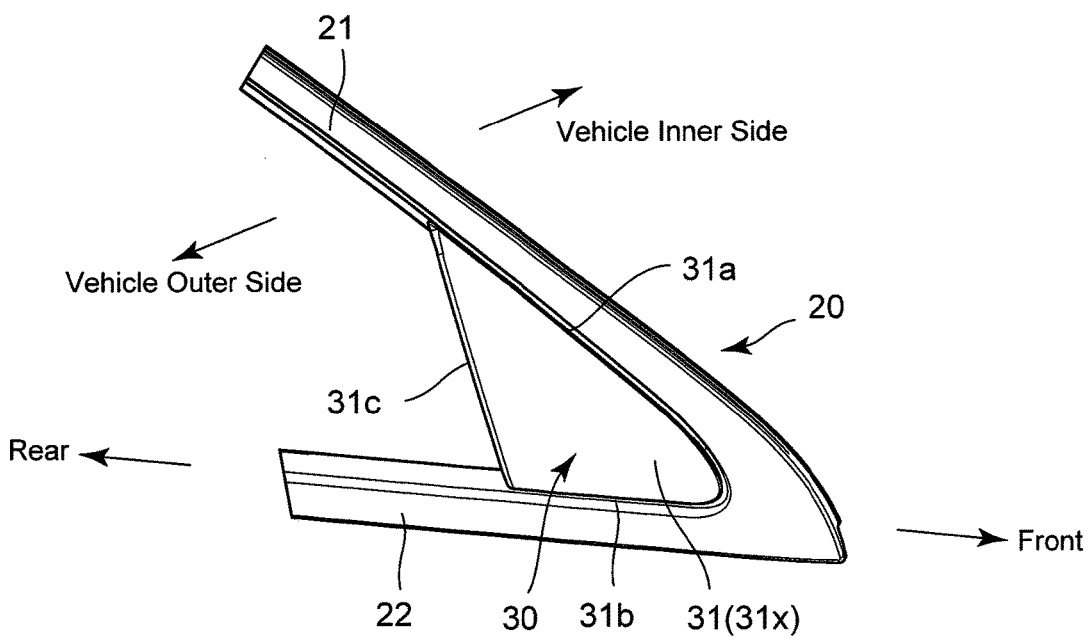
FIG. 6 is a perspective view of the garnish and the frame molding in a connected state.
Figure 7A:
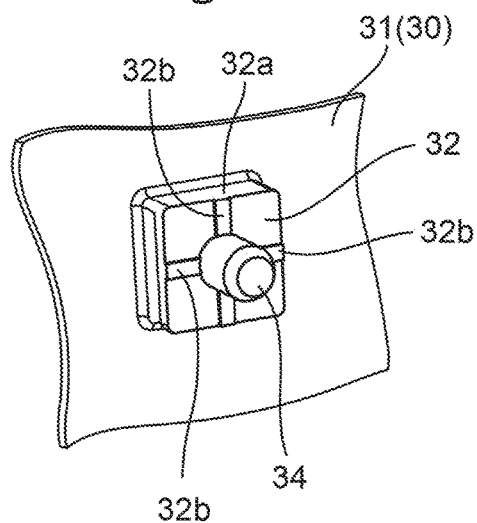
FIG. 7A is an enlarged perspective view of a seat portion of the garnish shown in FIG. 5.
Figure 7B:
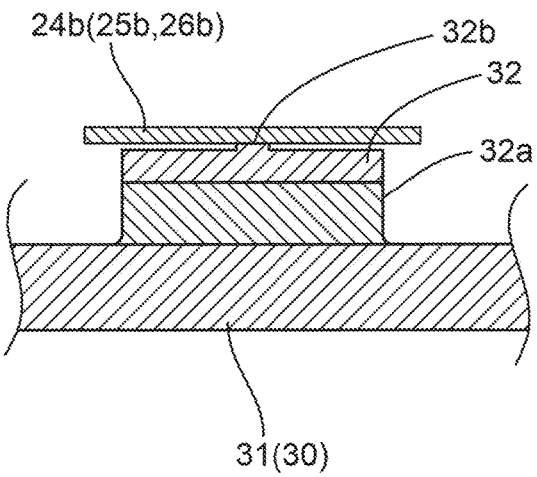
FIG. 7B is a cross sectional view taken along the line VII-VII shown in FIG. 5.
Figure 8A:
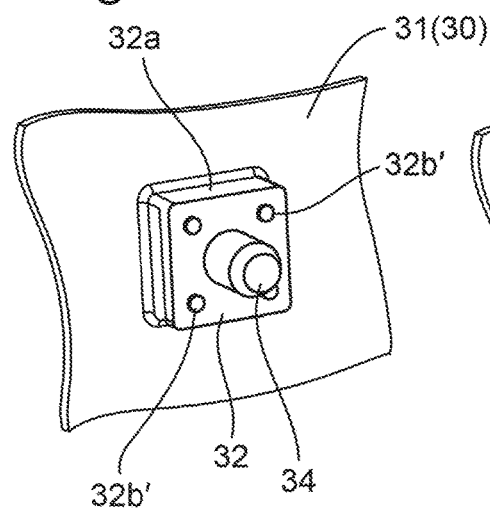
FIGS. 8A and 8B are perspective views corresponding to that of FIG. 7A, showing other embodiments of the seat portion of the garnish.
Figure 8B:
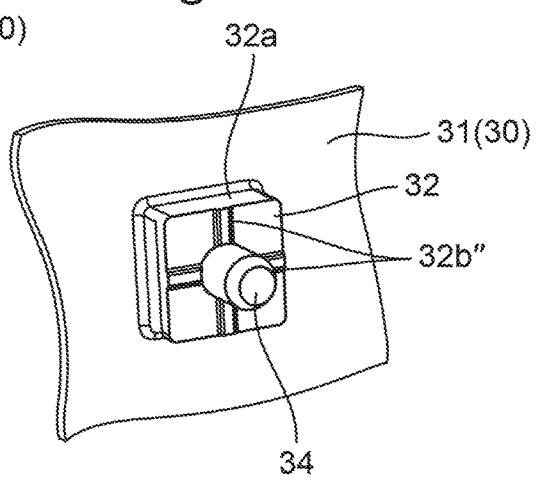

The garnish 30 is provided, on the surface of each seat portion 32 which is positioned on the frame molding 20 side, with contact projections (height control projections) 32b which reduce the contact area with the associated front-back directional vertical wall 24b, 25b or 26b, as shown in FIG. 5. FIGS. 7A and 7B show the details of the contact projections 32b. The contact projections 32b project toward the frame molding 20 in the shape of a cross with the associated boss 34 as a center, and the surfaces of the contact projections 32b (the surfaces thereof on the frame molding 20 side) come in contact with the associated front-back directional vertical wall 24b, 25b or 26b of the frame molding 20. Accordingly, reducing the contact area of each seat portion 32 of the garnish 30 with the associated front-back directional vertical wall 24b, 25b or 26b of the frame molding 20 facilitates the control of the distance of the garnish 30 from the frame molding 20. FIGS. 8A and 8B show examples of the shapes of different contact projections which are formed on the seat portions 32. Four point-like contact projections 32b' are formed around a boss 34 at regular intervals in FIG. 8A, and contact projections 32b" in the shape of a cross which are greater in height than the cross-shaped contact projections 32b are formed in a stepped shape in cross section in FIG. 8B.

Figure 3:
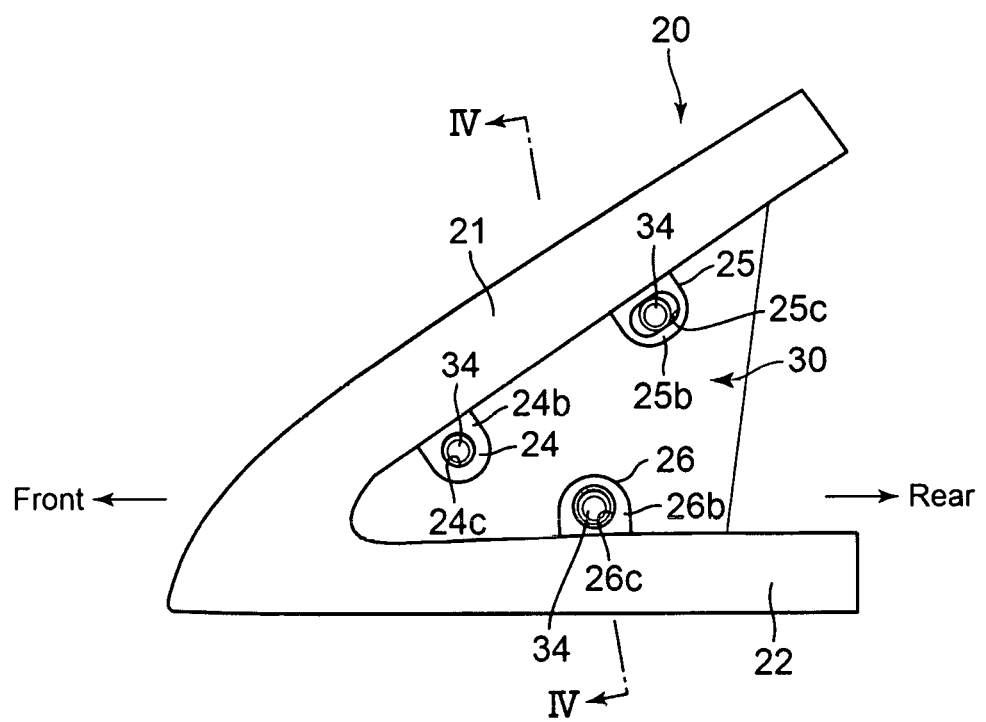
FIG. 3 is a side elevational view of the garnish-attached frame molding, viewed from the vehicle interior side.

The above described frame molding 20 and garnish 30 are engaged with each other by fitting the two bosses 34 which are arranged along the beveled edge 31a of the garnish 30 into the reference circular hole 24c of the support plate 24 of the frame molding 20 and the circular prevention hole 25c of the support plate 25 of the frame molding 20, respectively, and fitting the boss 34 which is arranged along the horizontal edge 31b into the relief hole 26c of the support plate 26. At this stage, the reference circular hole 24c and the associated boss 34 are engaged with each other with minimum clearance, which allows the garnish 30 to rotate about the reference circular hole 24c. In addition, since the rotation prevention hole 25c and the associated boss 34 are engaged with each other with minimum clearance in a direction orthogonal to the lengthwise direction of the rotation prevention hole 25c, the garnish 30 is prevented from rotating about the reference circular hole 24c when the rotation prevention hole 25c and the boss 34 are engaged with each other. On the other hand, since the clearance between the relief hole 26c and the associated boss 34 is set to be the greatest, the relief hole 26c and the associated boss 34 can be made to be easily engaged with each other in a state where the garnish 30 is prevented from rotating. Additionally, the end of the bosses 34 are thermally swaged thermally welded in an engaged state with the reference circular hole 24c, the rotation prevention hole 25c and the relief hole 26c, respectively. FIG. 3 shows the shapes of the bosses 34 before being thermally swaged and FIG. 4 (FIG. 2) shows the shapes of the bosses 34 after being thermally swaged. Since the bosses 34 are provided on the seat portions 32 that are spaced from the external surface portion 31 in the vehicle widthwise direction, there is no possibility of the heat which is produced during the thermally swaging of the bosses 34 reaching the external surface portion 31 and deforming the external surface portion 31 (causing shrinkage marks).

According to the connecting structure between the frame molding 20 and the garnish 30, since the frame molding 20 and the garnish 30 are directly connected without any intermediate member provided therebetween, the relative positional relationship between the frame molding 20 and the garnish 30 can be properly determined. For instance, an excellent outward appearance can be obtained by controlling the clearance between the beveled edge 31a of the external surface portion 31 of the garnish 30 and the inclined portion 21 of the frame molding 20, and the clearance between the horizontal edge 31b and the horizontal portion 22, which are shown in FIG. 4, with high precision.

In the above illustrated embodiment, the three bosses 34 are cylindrically columnar in shape and are the same size. However, although the boss 34 which is engaged in the reference circular hole 24c is desirably in the shape of a cylindrical column, either the boss 34 which is engaged in the rotation prevention hole 25c or the boss 34 which is engaged in the relief hole 26c does not necessarily need to have a cylindrical columnar shape.

Figure 9:
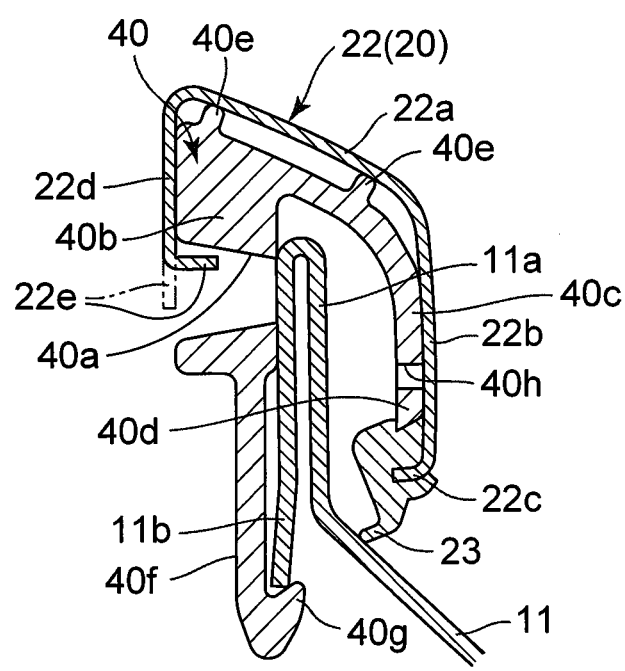
FIG. 9 is a cross sectional view taken along the line IX-IX shown in FIG. 2.

The frame molding 20 to which the garnish 30 is connected is fixed to the upper edge of the front end of the outer panel 11 in the assembling process of the vehicle door 10. FIG. 9 shows an example of the clip structure for fixing the horizontal portion 22 of the frame molding 20 to the molding mounting portion 11a of the outer panel 11.

The horizontal portion 22 is provided, across the length thereof, with a roof portion 22a, a vehicle exterior side portion 22b and a lip retaining portion 22c. The roof portion 22a constitutes the top portion of the horizontal portion 22, the vehicle exterior side portion 22b downwardly extends from the vehicle exterior side edge of the roof portion 22a, and the lip retaining portion 22c is formed by bending the lower edge of the vehicle exterior side portion 22b toward the vehicle interior side. Vehicle interior-side hanging portions 22d which extend downward are provided at two points on the vehicle interior side edge of the roof portion 22a. In addition, a swage portion 22e which extends downward is formed at the lower edge of each vehicle interior-side hanging portions 22d to project downward.

The frame molding 20 is provided with a body-touch lip 23 which is fixed to the lower edge of the vehicle exterior side portion 22b of the horizontal portion 22 and the lip retaining portion 22c. The body-touch lip 23 that is an integrally-molded product made of synthetic resin is a long member which extends in the lengthwise direction of the horizontal portion 22 and has a constant cross-sectional shape.

The frame molding 20 is further provided with a front and rear pair of clips 40 which are attached to an inner surface of the horizontal portion 22 (a surface thereof which faces the molding mounting portion 11a of the outer panel 11) and the body-touch lip 23.

The clips 40 are integrally-molded products made of a synthetic resin which has resiliency and is harder than the body-touch lip 23. The clips 40 are provided with a fixed portion 40b, a vehicle exterior-side downward-extending portion 40c, an engaging portion 40d, a pair of ribs 40e and a resilient engaging portion 40f. A swaged portion 40a, in the shape of a recess, is formed on the vehicle interior side of the fixed portion 40b. The vehicle exterior-side downward-extending portion 40c hangs after extending toward the vehicle exterior from the fixed portion 40b. The engaging portion 40d projects downward from a central portion, with respect to in the widthwise direction, of the lower end of the vehicle exterior-side downward-extending portion 40c. The pair of ribs 40e are projected from the upper surfaces of the fixed portion 40b and the vehicle exterior-side downward-extending portion 40c, respectively. The resilient engaging portion 40f downwardly extends from the lower surface of the fixed portion 40b. The resilient engaging portion 40f is provided at the lower end thereof with an engaging hook 40g which projects toward the vehicle exterior. The vehicle exterior-side downward-extending portion 40c and the resilient engaging portion 40f are resiliently deformable in the vehicle widthwise direction (the thickness direction of the outer panel 11). In addition, a through-hole 40h (flexible portion) that is positioned immediately above the engaging portion 40d is formed through the vehicle exterior-side downward-extending portion 40c. The portion of the vehicle exterior-side downward-extending portion 40c at which the through-hole 40h is formed (the portion of the vehicle exterior-side downward-extending portion 40c which is positioned around the through-hole 40h) is more flexible than the remaining portion of the vehicle exterior-side downward-extending portion 40c.

The frame molding 20 with the garnish 30 is attached to the molding mounting portion 11a of the outer panel 11 via the above described pair of clips 40, which are provided at front and rear positions on the horizontal portion 22. More specifically, the body-touch lip 23 is brought into contact with the vehicle exterior side surface of the outer panel 11, and the horizontal portion 22 is brought to cover the molding mounting portion 11a from above. Additionally, the resilient engaging portions 40f of the clips 40, which are positioned on the vehicle interior side of the molding mounting portion 11a, are made to be resiliently deformed toward the vehicle interior side, and the resilient engaging portions 40f are made to return to a free state after the engaging hooks 40g move down to a point below the lower edge of a folded-back portion 11b, i.e., the lower end of the molding mounting portion 11a, thereby causing the engaging hooks 40g of the resilient engaging portions 40f to be engaged with the lower edge of the folded-back portion 11b from the vehicle interior side. At this stage, the engaging portions 40d of the vehicle exterior-side downward-extending portions 40c of the clips 40 bite into the body-touch lip 23 from the top surface thereof. Additionally, the frame molding 20 is fixed to the outer panel 11 by bending the swage portions 22e of the horizontal portion 22 into the swaged portions 40a of the clips 40.

The frame molding 20 can also be fixed to a door frame bracket 16 (FIGS. 2 and 4) which is fixed to the front end of the outer panel 11. For this fixation, a fixing hole 16a (FIG. 2) which is formed on the door frame bracket 16 can be used. As a matter of course, the above illustrated fixing structure to fix the frame molding 20 to the outer panel 11 is merely an example, and accordingly, the present invention is not limited to the above illustrated fixing structure.

Although the above described embodiment is a front door to which the present invention has been applied, the present invention can also be applied to a rear door which has a triangular space behind a window opening formed by an upright pillar sash and an upper sash that are positioned above a door panel.

INDUSTRIAL APPLICABILITY

The present invention can be widely applied to vehicle doors in general.

REFERENCE SIGN LIST

10 Vehicle door
11 Outer panel (Door panel)
12 Door sash
13 Rear sash
14 Upper sash
15 Belt molding
20 Frame molding
21 Inclined portion
22 Horizontal portion
21a 22a Outward appearance surface
24 25 26 Support plate
24a 25a 26a Inclined wall
24b 25b 26b Front-back directional vertical wall
24c Reference circular hole
25c Rotation prevention hole
26c Relief hole
30 Garnish
31 External surface portion
31x Outward appearance surface
31a Beveled edge
31b Horizontal edge
31c Vertical edge
32 Seat portion
32a Connecting rib
33 Clearance
34 Boss

The invention claimed is:
1. A garnish and frame molding apparatus comprising:
a frame molding which is configured to be fixed to a door panel and includes a horizontal portion, which extends along an upper edge of said door panel, and includes an inclined portion having a longitudinal axis which extends obliquely upwards from said horizontal portion to be connected to an upper sash attached to said door panel; and
a garnish which is made of synthetic resin is fixed to said frame molding and has an external shape that corresponds to external shapes of said horizontal portion and said inclined portion of said frame molding,
wherein said frame molding comprises a plurality of support plates which project inwardly from said horizontal portion and said inclined portion to directly connect with said garnish,
wherein bosses are integrally formed with said garnish and are provided along a periphery of said garnish, and
wherein said bosses are arranged to connect said garnish to said support plates,
wherein, a support hole is formed in each of said support plates,
wherein said bosses are thermally welded to said support holes and are formed on said garnish to project from said garnish,
wherein at least two of said support plates are provided on said inclined portion,
wherein at least one of said support plates is provided on said horizontal portion,
wherein said support hole of one of said at least two support plates on said inclined portion comprises a reference circular hole which is engaged with a first boss of said bosses of said garnish with a first clearance between said reference circular hole and said first boss, wherein said support hole of the other of said at least two support plates on said inclined portion comprises a rotation prevention hole formed as an elongated hole extending parallel to said longitudinal axis of said inclined portion, wherein a second clearance is defined between said rotation prevention hole and a second boss of said bosses of said garnish in a direction parallel to said longitudinal axis of said inclined portion, wherein said bosses are cylindrical columns, wherein said support hole and said second support hole, of said support plate provided on said horizontal portion is a relief hole which is engaged with a third boss of said bosses of said garnish with a third clearance between said relief hole and said third boss, and wherein said second clearance is larger than said first clearance and wherein said third clearance is larger than said first clearance.

2. The garnish and frame molding apparatus according to claim 1, wherein said garnish comprises:

an external surface portion which is positioned to be visible from an outer side of said door panel; and a plurality of seat spaced from said external surface portion, and wherein said bosses are formed on said seat portions to project therefrom.

3. The garnish and frame molding apparatus according to claim 2, wherein contact projections which come in contact with said support plates are formed on said seat portions.

4. The garnish and frame molding apparatus according to claim 3, wherein each of said contact projections is linear.

5. The garnish and frame molding apparatus according to claim 3, wherein said contact projections are configured to radially extend from said bosses.

6. The garnish and frame molding apparatus according to claim 3, wherein each of said contact projections is an embossed dot.

7. The garnish and frame molding apparatus according to claim 1, wherein said horizontal portion is provided with a clip that is configured to engage with said door panel.

8. The garnish and frame molding apparatus according to claim 1, wherein said horizontal portion is provided with a body-touch lip that is configured to come into contact with said door panel.

9. The garnish and frame molding apparatus according to claim 1, wherein said garnish is provided with a plurality of seat portions corresponding to said plurality of support plates, and wherein said plurality of seat portions are spaced from said garnish by connecting ribs, wherein said.

10. A method of producing a vehicle door provided with a frame molding of claim 1, said method comprising:

a step of fixing said garnish to said frame molding; and a step of fixing said frame molding to said door panel.

\* \* \* \* \*